United States Patent
Naske

(10) Patent No.: US 8,736,669 B2
(45) Date of Patent: May 27, 2014

(54) METHOD AND DEVICE FOR REAL-TIME MULTI-VIEW PRODUCTION

(75) Inventor: Rolf-Dieter Naske, Kakenstorf (DE)

(73) Assignee: Sterrix Technologies UG, Kakenstorf (DE)

( * ) Notice: Subject to any disclaimer, the term of this patent is extended or adjusted under 35 U.S.C. 154(b) by 506 days.

(21) Appl. No.: 12/810,681

(22) PCT Filed: Dec. 27, 2007

(86) PCT No.: PCT/DE2007/002326
§ 371 (c)(1),
(2), (4) Date: Sep. 15, 2010

(87) PCT Pub. No.: WO2009/082990
PCT Pub. Date: Jul. 9, 2009

(65) Prior Publication Data
US 2011/0025822 A1    Feb. 3, 2011

(51) Int. Cl.
*H04N 13/02* (2006.01)
*H04N 13/00* (2006.01)
*H04N 13/04* (2006.01)

(52) U.S. Cl.
CPC ............... *H04N 13/02* (2013.01); *H04N 13/00* (2013.01); *H04N 13/04* (2013.01)
USPC ............................... 348/44; 375/240; 348/51

(58) Field of Classification Search
None
See application file for complete search history.

(56) References Cited

U.S. PATENT DOCUMENTS 5,084,763 A * 1/1992 Naradate et al. ............... 348/51
5,652,616 A * 7/1997 Chen et al. ..................... 348/43
5,936,663 A * 8/1999 Tabata et al. ................... 348/51
6,445,814 B2 * 9/2002 Iijima et al. .................. 382/154
6,847,728 B2   1/2005 Tai et al.
2002/0191841 A1 12/2002 Harman (Continued)

FOREIGN PATENT DOCUMENTS

| CA | 2 212 069 | 6/2001 |
| CA | 2 553 473 A1 | 1/2007 |
| EP | 1 175 104 B1 | 4/2005 |
| WO | WO 2007/035054 A1 | 3/2007 |

OTHER PUBLICATIONS

Nabeshima et al, "Frame Rate Stabilization by Variable Resolution Shape Reconstruction for On-Line Free-Viewpoint Video Generation", Lecture Notes in Computer Science (LNCS 3852), Springer-Verlag, Berlin, Germany, 2006, vol. 3852, pp. 81-90.*

(Continued)

*Primary Examiner* — Jay Patel
*Assistant Examiner* — Reza Aghevli
(74) *Attorney, Agent, or Firm* — Locke Lord LLP; Peter J. Fallon; Alan B. Clement

(57) ABSTRACT

From a stereo image having at least 2 perspectives additional virtual perspectives are produced, wherein the processing time for the virtual perspectives is less than a specified value and simultaneously the multi-view image quality is maximized by identifying image areas that have not changed between two stereo images of the image sequence. In these areas the associated disparity map also did not change and the disparity values are reused. In addition, the processing parameters for calculating the virtual perspectives are continuously adjusted through continuous time measurement during processing such that the quality is always at a maximum. An adaptive method is obtained, which is also able to respond to load fluctuations of the underlying hardware device.

7 Claims, 5 Drawing Sheets

(56) References Cited

U.S. PATENT DOCUMENTS

| | | | |
|---|---|---|---|
| 2005/0185048 A1* | 8/2005 | Ha | 348/42 |
| 2006/0146138 A1 | 7/2006 | Xin et al. | |
| 2007/0024614 A1* | 2/2007 | Tam et al. | 345/419 |
| 2007/0064800 A1* | 3/2007 | Ha | 375/240.12 |
| 2007/0104276 A1* | 5/2007 | Ha | 375/240.16 |
| 2009/0153652 A1* | 6/2009 | Barenbrug | 348/54 |
| 2009/0195640 A1* | 8/2009 | Kim et al. | 348/43 |

OTHER PUBLICATIONS

Ueda et al, "Real-Time Free-Viewpoint Video Generation Using Multiple Cameras and a PC-Cluster", Lecture Notes in Computer Science (LNCS 3331), Springer-Verlag, Berlin, Germany, 2004, vol. 3331, pp. 418-425.*

Chen et al, "The Emerging MVC Standrad for 3D Video Services", EURASIP Journal on Advances in Signal Processing, vol. 2009, Article ID 786015, Aug. 1, 2009, pp. 1-13.*

Xi Ou et al., "Efficient Free Vewpoint Image Reconstruction From Multi-Focus Imaging Sequences Based on Dimension Reduction," Proceedings of 2007 International Symposium on Intelligent Signal Processing and Communication Systems (Nov. 28-Dec. 1, 2007, Xiamen, China); pp. 152-155.

International Preliminary Search Report on Patentability issued on Dec. 27, 2007, for corresponding International Application No. PCT/DE2007/002326.

PCT Notification of the Recording of a Change, Jun. 26, 2010.

* cited by examiner

METHOD AND DEVICE FOR REAL-TIME MULTI-VIEW PRODUCTION

This application is a national phase entry under 35 USC §371 of International Application Number PCT/DE2007/002326, filed on Dec. 27, 2007, entitled "METHOD AND DEVICE FOR REAL-TIME MULTI-VIEW PRODUCTION", of which is herein incorporated by reference.

PROBLEM STATEMENT

Autostereoscopic displays that can show several perspectives in parallel and allow several viewers from different viewing positions to perceive a spacial image without optical aids have become increasingly popular in recent years.

The number of perspectives presented in parallel varies in general between 4 and 32. But this number may be even higher in future.

The set of perspectives presented in parallel and that have been captured at the same moment t, is referred to in the following as Multi-View image.

Different requirements and constraints arise from the production process, ranging from capturing with a stereo camera to encoded transmission and presentation on an auto-stereoscopic display:

- For capturing the camera has to be easy to carry and handle. It should thus be light weighted and equipped with only few lenses (for example only 2).
- For transmission, as few perspectives as possible should be broadcasted in order to have maximum resolution for each perspective.
- For visualization, as many perspectives as possible should be presented in order to create as many optimal viewing positions as possible.

These requirements imply the conclusion that it would be best to generate as many perspectives as possible at the place of presentation. Additionally, it has to be taken into account that the capacity of different apertures leads to an execution time that is shorter than the time between two stereo images. This is the objective of the filed patent.

STATE OF THE ART

The MPEG organization in 1996 already approved a so-called "Multiview-Profile" for the transmission of stereo images allowing consistent encoding and transmission of more than one camera position consistently. In practice, this is mostly used for 2 camera positions for the above-mentioned reasons.

Apart from MPEG's Multiview profile, which will become of greater importance in the future, there are other relevant, generally analog, formats arising from historical reasons in the past. Here such formats as field sequential, interlaced, over/under and side-by-side from the field of video recorders can be mentioned. In these cases there are no disparity maps available as a source of information.

In CA 2 212 069 (Ref. 4) a method is presented where an optimal disparity is found by using a least squares optimization of reference blocks in the search area. This method is used for encoding a sequence of stereo images. But it is only applied to the luminance values of the image. Additionally, parameters of an affine transformation shall compensate the potential differences of the calibration of the camera lenses. As the presented method has especially been developed for the encoding and decoding of stereo images sequences, there is a close relationship with MPEG encoding methods.

In CA 2 553 473 (Ref. 5) a depth map is generated by analyzing the edges of a monoscopic image sequence, which together with the original image synthesizes a stereo image. But, as there is no information about the occlusions and the associated image content, this method is not acceptable here for an optically correct Multi-View generation.

In US 2007/0104276 A1 (Ref. 6) a method is presented based on an MPEG Multiview profile standard. The procedure here is such that for a reference image (for example the left image) disparity vectors to all other sub-images of the Multi-View image are computed. Based on the reference image and the disparity vectors the sub-images is reconstructed and the difference/correlation between the original sub-image and the reconstructed sub-image is defined using an arbitrary norm. The reconstruction error will be used for the definition of an estimation structure.

In WO 2007/035054 A1 (Ref. 7) an encoding method is presented for efficiently encoding and decoding a Multi-View image from several cameras. Here the disparity is not computed for all blocks. The disparity of the blocks not computed is generated by interpolation on the basis of an associated reference list. This way it is not necessary to compute the disparity for all blocks. Linear or cubic two-dimensional interpolation methods are applied to estimate the disparity for the blocks not computed.

In US 2005/0185048 A1 (Ref. 8) an in-between perspective is generated by defining a block in the in-between perspective and by shifting this block in the left and right image in parallel by some disparity until the absolute value of the sum of the pixel values is minimal. The image point of the in-between perspective is defined as the mean value (generalized "blending") of the found minimal pixel value of the left and right images.

In the methods and apertures presented here, from a stereo image with at least 2 perspectives (in general 8 and more) virtual perspectives are generated under the preconditions that the time for the total generation process is less than the given frame rate, and that in parallel the Multi-View image quality is maximized.

It is not assumed that a disparity map already exists. But one can be used, if available, to help increase the processing speed.

In the typical case, the images areas are identified that have not changed between two stereo images of an image sequence. In these areas the corresponding disparity map cannot be changed, if the geometric parameters of the lenses of the stereo camera have not changed in the meantime.

At the same time, constant, ongoing measurement of time during execution allows adjustment of the processing parameters, ensuring that optimum quality at all times.

This yields an adaptive method able to react to strain variations of the underlying hardware aperture.

DESCRIPTION OF THE DRAWINGS

FIG. 4 shows an example of how a hardware structure consisting of several processing units could look like.

DESCRIPTION OF THE METHOD IN DETAIL

Figure 1:
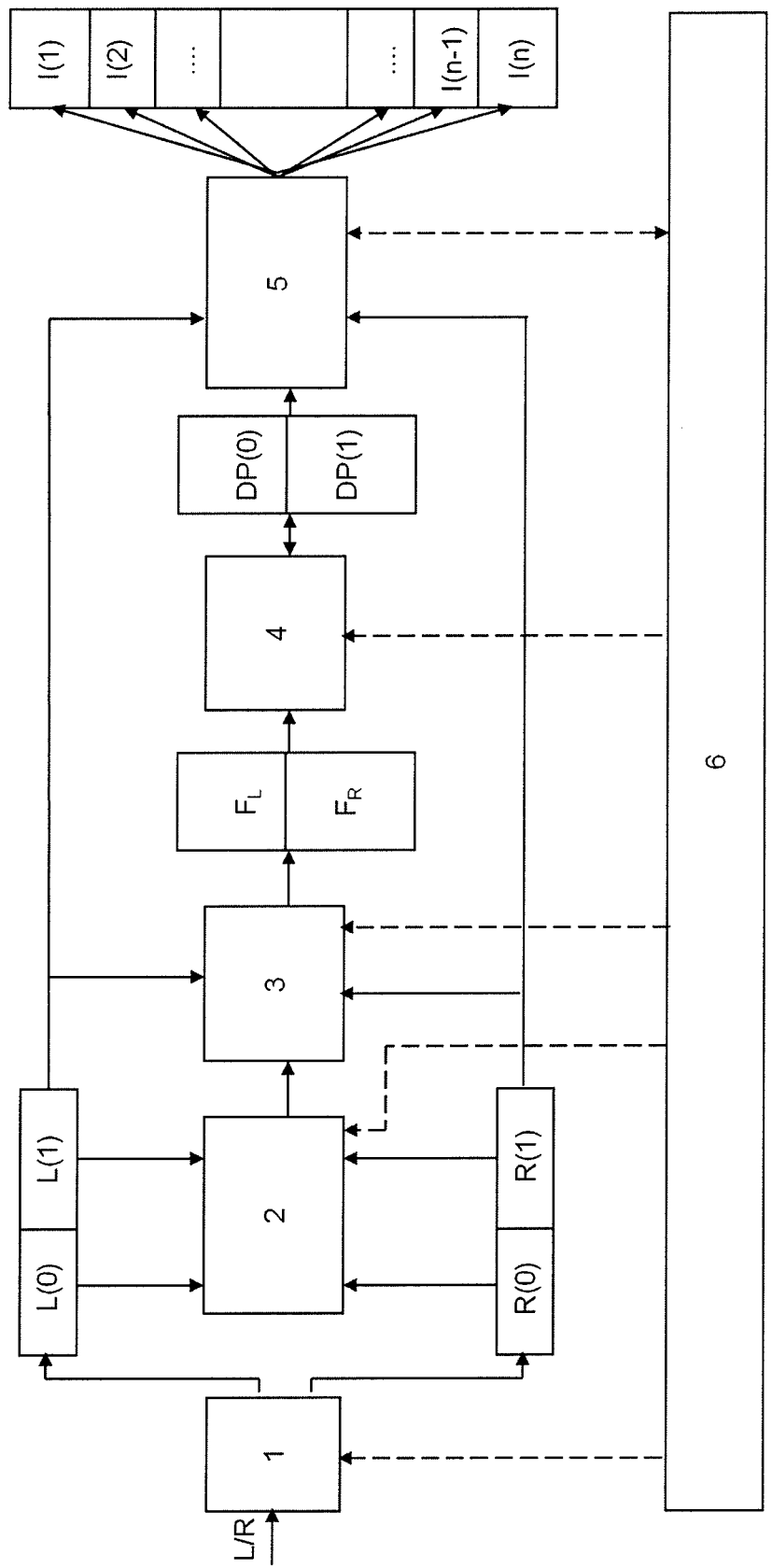
FIG. 1 is a block diagram of the different processing steps and their correspondence.
Figure 2:
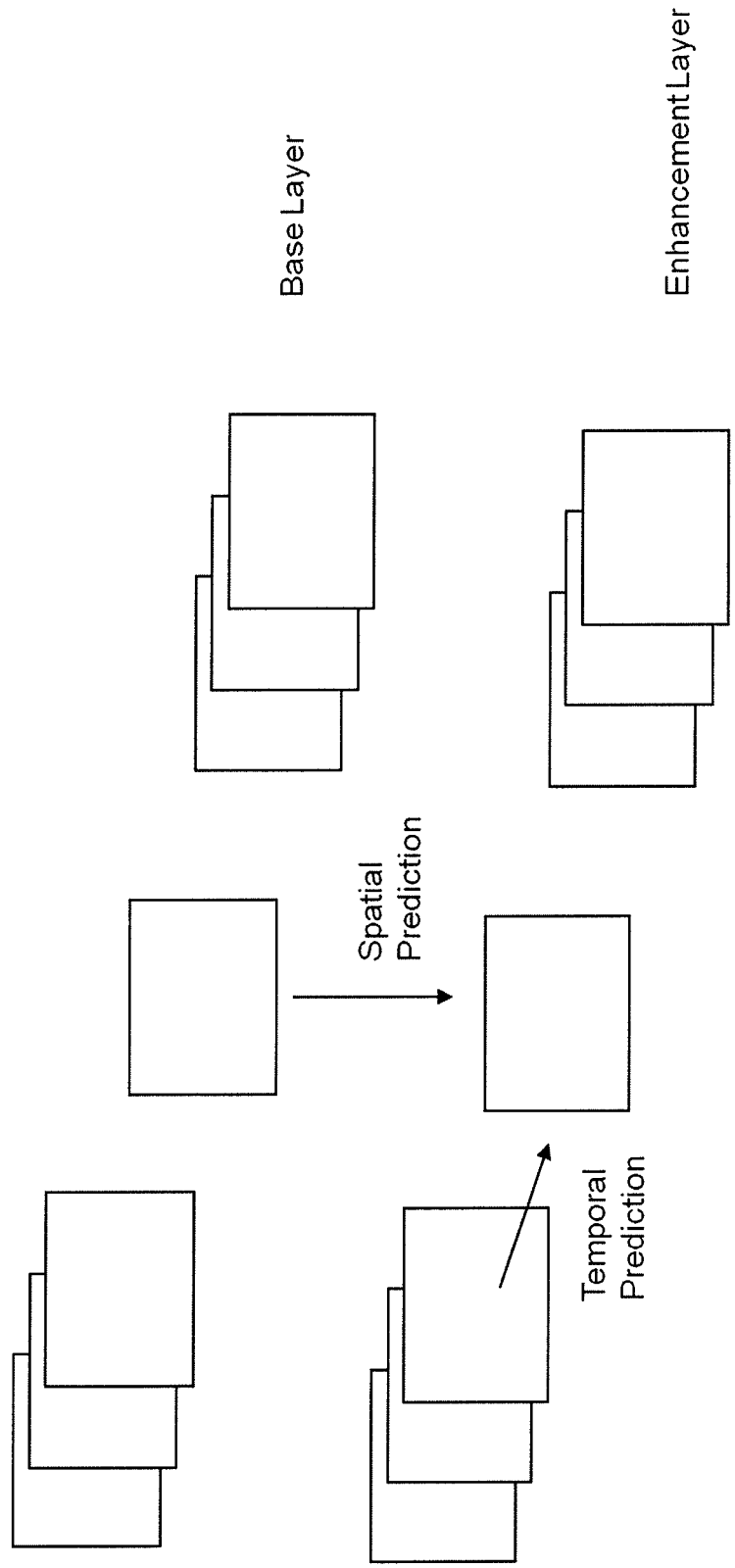
FIG. 2 shows the basic principle of Multi-View encoding defined under the MPEG standard.

Every real-time multi-view generation starts with receiving a stereo image in a certain stereo format. The stereo image consists of two sub-images of the same scene that have been captured at the same time from different perspectives. It can be of any arbitrary size. Today's image sizes can go up to twice HDTV (1920×1080) resolution.

The received stereo image is split in left sub-image L and a right sub-image R, and scaled to a certain size G(t). The size G(t) is the processing size. Depending on the processing power and workload of the hardware structure used, G(t) can vary over time. At the end of every real-time multi-view generation the processing time is measured and G(t) either enlarged or reduced.

A start value of G(t) will be set during start of the method. After about 2 to 3 real-time multi-view generations, G(t) has automatically/adaptively adjusted itself to a certain optimal value. This scaling is done by the so-called compressor (1).

After compression to the correct processing size, the areas that have not changed between the current image L(1) and R(1) and the previous image L(0) and R(0) respectively are searched. To do so, the image is divided into blocks of identical size (for example 16×16) and every block is compared with the same block of the previous image. If the difference is below a threshold E, all pixels of the block will be marked as unchanged. The similarity can be based on grey values, RGB values or other values. For computation of the similarity both distance measures and correlations measures can be used. This recognition of unchanged areas can be done in the left image as well as in the right image. For simplification and illustration purposes regarding this description, in the following an example is discussed in which constant detection is executed in the left image.

The identification of the constant blocks is executed by the so-called constant detector (2). In the left sub-image for example, pixels can be marked for which there does exist a disparity, meaning they are present in the right image as well, or such pixels that are not present in the right sub-image because of a right occlusion. If constant detection is executed in the right sub-image, this results in pixels with disparity or left occlusions.

The result of the constant detector is passed to the feature extractor (3). For pixels not marked as constant, the necessary features are now computed. For pixels marked as constant, the features have been computed during the last real-time multi-view generation.

This feature extraction is executed for both images L(1) and R(1). Large constant areas reduce execution time significantly.

The result of feature extraction is stored in the memories $F_L$ and $F_R$ for the left and right sub-images. As the feature memories $F_L$ and $F_R$ have the same size as G(t), the computed new features of the pixels will simply be stored in the memory position. Constant pixels automatically keep their feature vectors as long as the size G(t) has not been changed during the previous step.

The RGB values, edge values or homogenuity values for example can be used as features. All known feature extraction methods, which assign features to the pixels of an image, can be used.

The memories $F_L$ and $F_R$ are available for the image analyzer (4). The task of the image analyzer is to compute the disparity map. For this computation dynamic programming methods for example can be applied to the single lines of the left and right sub-image to find the optimal assignment.

But applying this method to the single lines only makes sense if the stereo image is in a normalized stereo form. If this is not the case, it can be achieved by a linear back and forth transformation, or by applying a modified disparity estimation method, using the epipolars for example. For simplification purposes the normalized stereo form will be discussed in the following.

As this step is one of the most time consuming, special attention must be paid to the reduction of execution time. The result of the constant detector is thus also available in this step. For each pixel the image analyzer has the information
K(i,j):={1, if pixel (i,j) has changed, 0, otherwise.

For all pixels (i, j) for which K(i, j)=0, the disparity DP (0, i, j) can be transferred to DP (1, i, j). DP (1, i, j) is the matrix of the disparities of the current moment.

In general, for the similarity evaluation a neighborhood of the pixel (i, j) with the feature vector $F_L$(i, j) is used. The neighborhood can either be a rectangle or restricted by geometric properties like edges. As a similarity measure any norm such as the euclidean, absolute value or correlation can be used. Additionally, features in the norm can be weighted, the weightings being imported upon start up.

The constant disparities of a line can result in an optimization problem with restrictions in a way that the disparity will only be computed for those pixels (i, j) for which K (i, j)=1, or resulting for example in a segmented dynamic programming problem where optimization is only done within a segment for which all K(i, j)=1 is true.

The value DP (1, i, $j_u$) with the smallest j of a segment such that K (i, $j_u$)=0 is used as the left starting point. The value DP (1, i, $j_o$) with the largest j of the segment such that K (i, $j_o$)=0 is taken as the right ending point of the segment.

Therefore, a dynamic programming problem will only be solved in the segment from $j_u$ to $j_o$. Of course it can result in several segments within the same line. The matrix DP (1, i, j) is afterwards defined as:

$$\text{signed } DP(1, i, j) := \begin{cases} j^*, & \text{if pixel } (i, j) \text{ from the left sub-image will be as-to the pixel } (i, j^*), \\ -1, & \text{if pixel } (i, j) \text{ is a right occlusion.} \end{cases}$$

Figure 3:
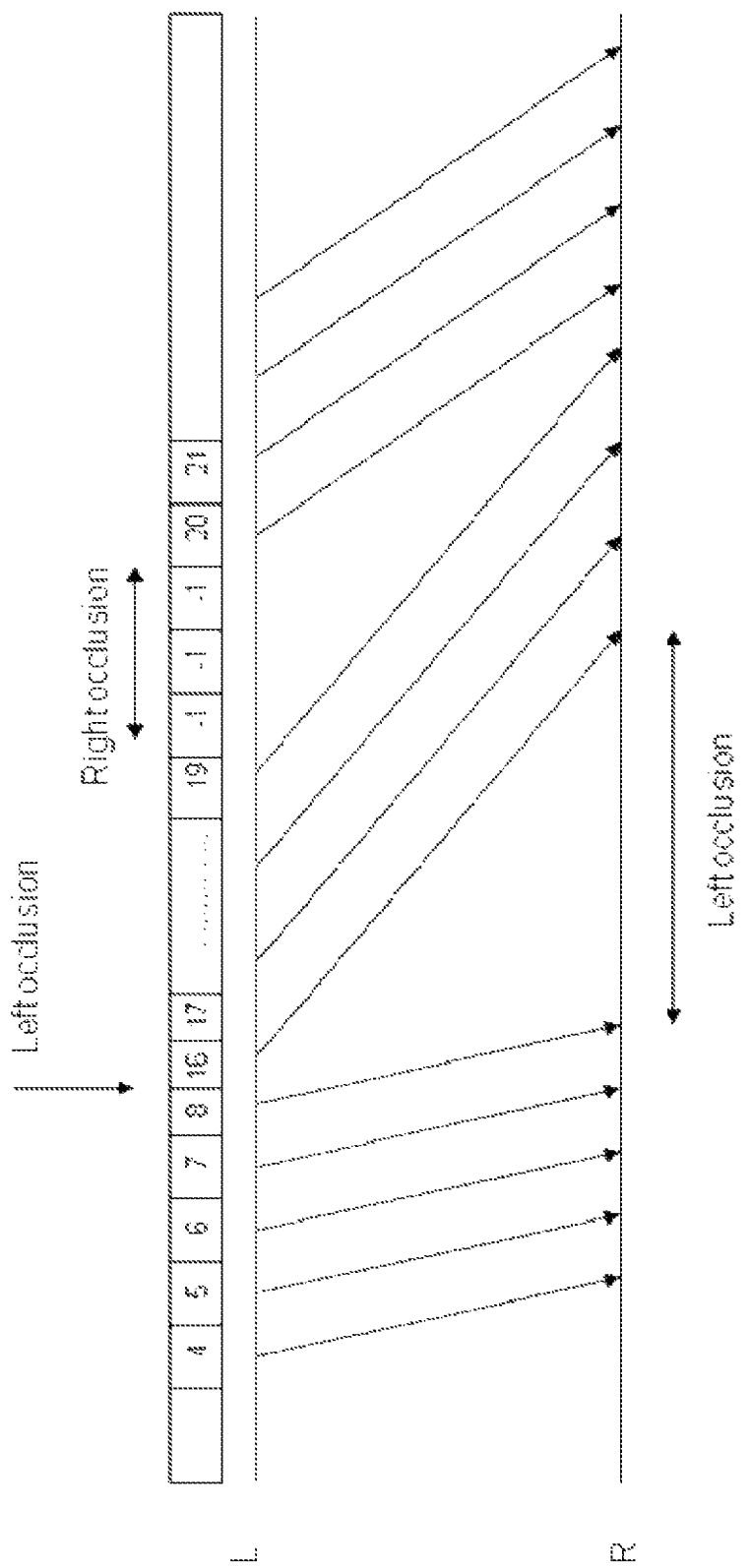
FIG. 3 shows in one line of the disparity map how the assignable image pixels of the left stereo image can be assigned to the right image pixels. Right occlusions are indicated by a −1 in the corresponding field element of the left sub-image. Left occlusions result in gaps in the assignment to the right image pixels.

Left occlusions can be identified in DP(1) if there is a gap between DP(1, i, j) and DP(1, i, j+1). A single line of DP(1) is shown in FIG. 3.

The image analysis generates the matrix DP(1).

The image synthesizer (5) uses the disparity maps DP(1) as well as the sub-images L(1) and R(1) and copies them to I(1) and I(n). Only the virtual perspectives (2) to I(n−1) will be generated.

The image synthesizer practically implements a virtual camera panning motion from L(1) to R(1) with n−2 stopovers if the multi-view image has to contain n perspectives. n>2 can be modified at any time by the viewer.

For all (i,j) of the left sub-image the following will be carried out:

If DP (1, i, j)=j* is true, Δj*:=(j*−j)/(n−1) will be computed.

The virtual camera panning motion implies for a pixel L (1, i, j) that $$I(k,i,j+\Delta j^*(k-1)):=L(1,i,j), k=1, \ldots n$$

will be set.

The area of a right occlusion for which $DP(1, i, j)=-1$ holds is slowly phased out until it no longer exists in $I(n)$ anymore.

Conversely, a left occlusion defined by $|DP(1, i, j)-DP(1, i, j+1)|>1$, is slowly phased in.

If there is an assignment $j^*$ for a pixel $L(1, i, j)$, this does not ensure that $L(1, i, j)=R(1, i, j^*)$ holds. This could be caused by different noise in the images or by the camera calibration. In this case, an additional blending can be applied from $L(1, i, j)$ to $R(1, i, j^*)$, such that $I(n, i, j^*)=R(1, i, j^*)$ can be enforced.

If rounding errors during the computation of $j+\Delta j^*(k-1)$ result in some pixels not being generated in a multi-view perspective, these missing pixels are inserted by geometric interpolation from the set neighboring pixels.

After finishing the image synthesis, the multi-view image with n perspectives is available for presentation on the display.

The control unit (6) measures the time $\Delta t$ elapsed since receiving the stereo image. For every video format the image frequency (PAL=50 Hz, NTSC=60 Hz, HDTV=100 Hz) is known.

If the total computation time $\Delta t$ is longer than the time between two stereo images, the control unit modifies the processing parameters. To do so, the control unit has two options:
1. Some of the features of the feature vectors $F_L$ and $F_R$ are no longer evaluated, for example the homogeneity measure.
2. The processing size $G(t)$ will be reduced. Through this the resolution will be reduced.

If on the other hand the processing time $\Delta t$ is significantly shorter than the time between receiving two stereo images, the control unit can enlarge the resolution or add additional features to improve the quality. After changing the control parameters modifications are suspended for the next 3-4 time measurements to let the new control parameters have an effect on the processing steps.

Thus the overall system always dynamically and adaptively adjusts itself to the hardware workload.

Figure 4:
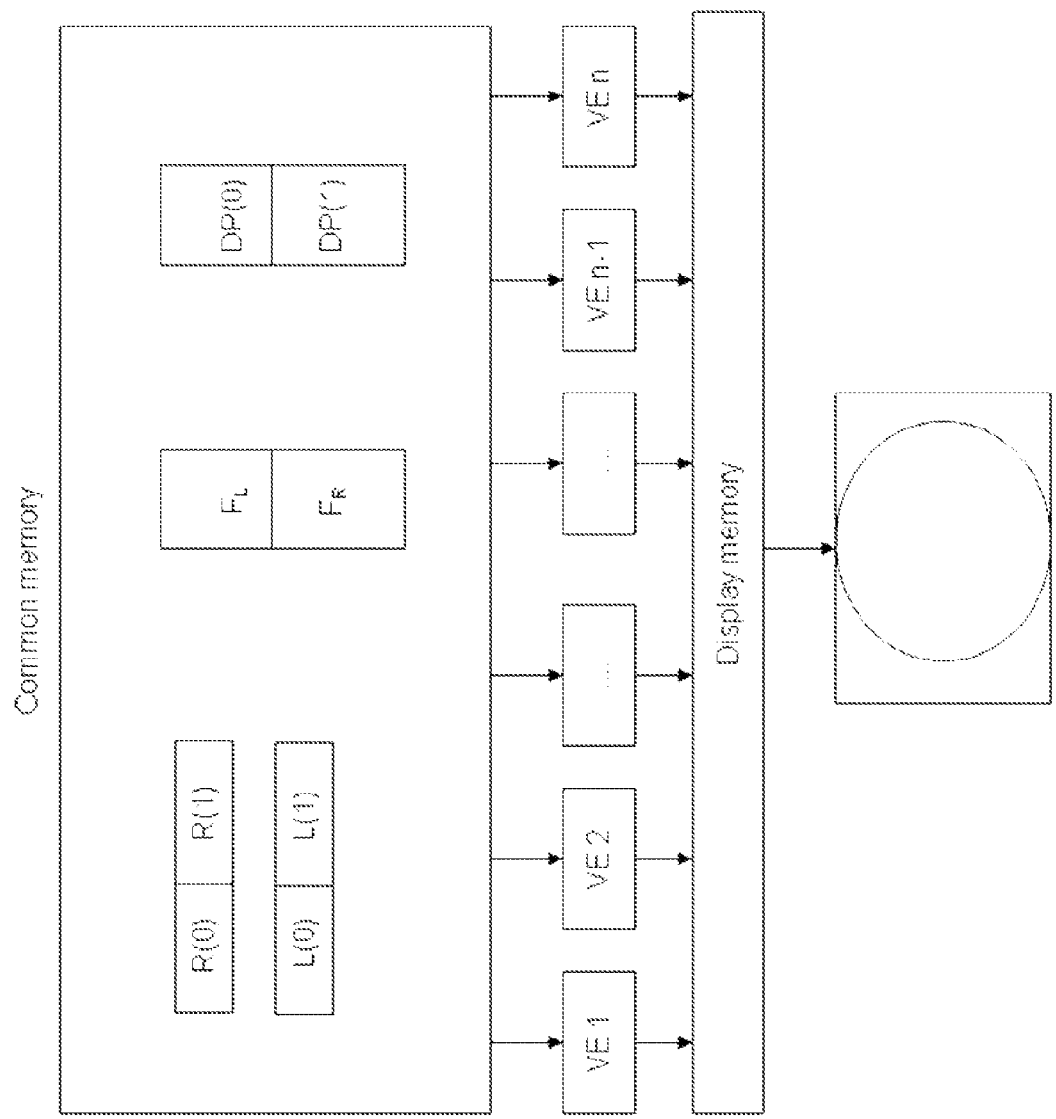

All steps are designed so that they can be executed by multiple processing units in parallel (multi-core). This is shown in FIG. 4.

Figure 5:
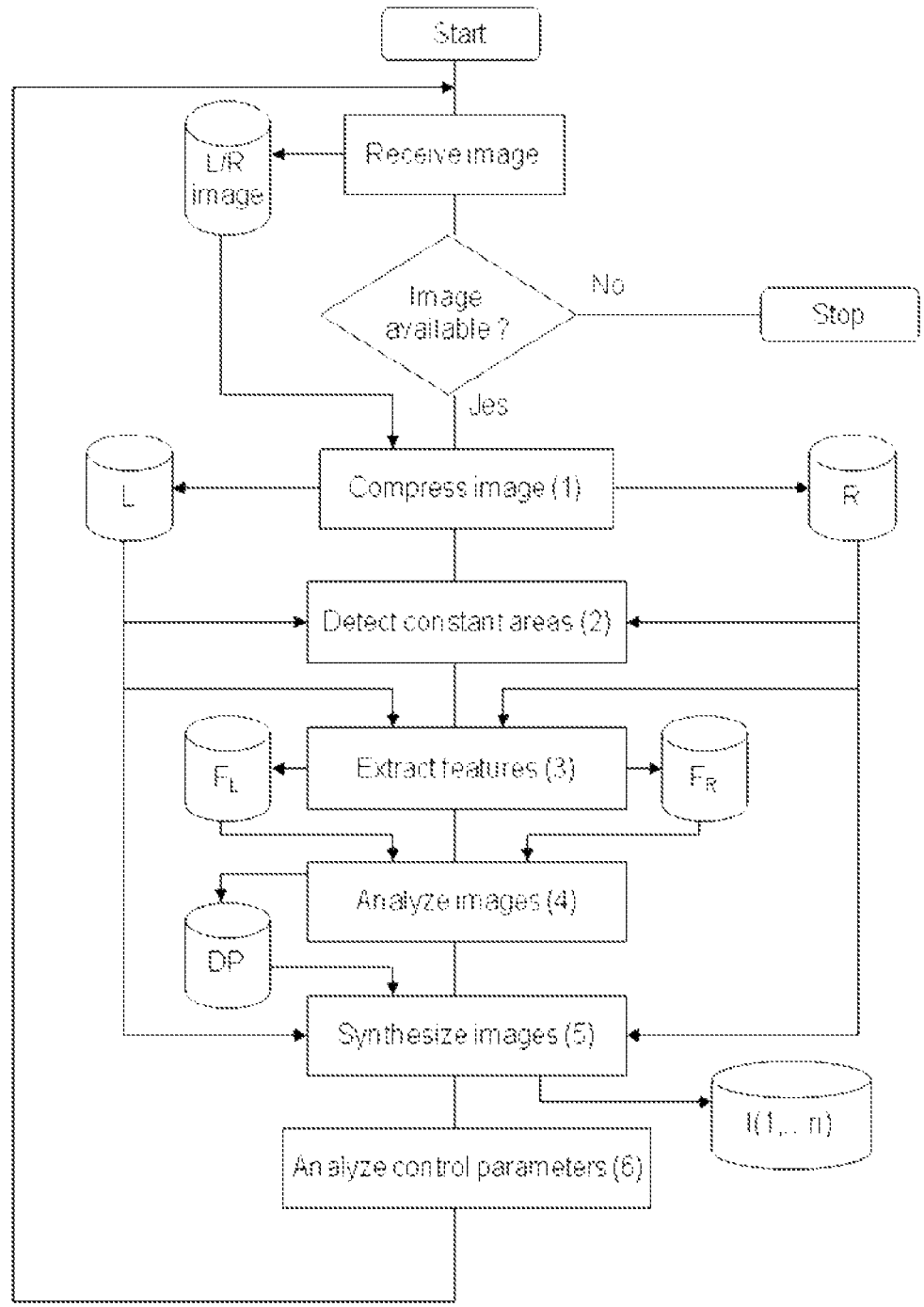
FIG. 5 shows a flow chart of real-time multi-view generation.

All processing steps are outlined in FIG. 5 in the form of a flow chart.

In a further embodiment the constant detector, which finds the constant blocks, will be combined with the MPEG encoding algorithm.

Various MPEG encoding algorithms are also using blocks (in general of size 16×16) to identify unchanged areas. These blocks are not transmitted. An integrated method could therefore use this information or the additional information from the enhancement layer and process for the subsequent steps.

REFERENCES

1. US 2006/01616138 A1 and additional filings, "Method and System for Synthesizing Multiview Videos", Nov. 30, 2005, Jun Xin Quincy
2. EP 1 175 104 B1 and additional filings, "Stereoscopic Image Disparity Measuring System", Jun. 15, 2001, Jeong, Hong et al.
3. U.S. Pat. No. 6,847,728 B2, "Dynamic Depth Recovery from Multiple Synchronized Video Streams", Dec. 9, 2002, Hai Tao et al
4. CA 2 212 069, "Optimal Disparity Estimation for Stereoscopic Video Coding", Aug. 6, 1996, Chen, Xuemin et al
5. US 2007/0024614 A1, "Generating A Depth Map from a Two-dimensional Source Image for Stereoscopic and Multiview Imaging", Jul. 25, 2006, Wa James Tam et al.
6. US 2007/0104276 A1, "Method and Apparatus for Encoding Multiview Video", Nov. 6, 2006, Ha, Tae-Hyeun
7. WO 2007/035054 A1, "Method of Estimating Disparity Vector, and Method for Encoding and Decoding Multi-View Moving Picture using the Disparity Vector Estimation Method", Sep. 22, 2005, Ha, Tae-Hyeun
8. US 2005/0185048 A1, "3-D Display System, Apparatus, and Method for Reconstructing Intermediate-View Video", Jan. 27, 2005, Ha, Tae-Hyeun

The invention claimed is:

1. A method for the generation of m>0 synthetic images, from a stereo image of a stereo image sequence comprising at least a previous stereo image and a current stereo image, each with two or more sub-images having pixels the sub-images being received left and right images, the method comprising:
identifying a constant image area consisting of pixels in a sub-image of a current stereo image that deviates from the pixels of an area of a sub-image of the previous stereo image by less than a given value;
the pixels of the previous stereo image having computed disparity values,
re-using the computed disparity values from the pixels of the area of the sub-image of the previous stereo image and assigning the computed disparity values to the pixels of the identified area of the sub-image of the current stereo image;
computing the disparity values for the non-constant image areas using processing parameters comprising vectors $F_L$ and $F_R$ and the processing size $G(t)$ wherein the vectors $F_L$ and $F_R$ assign features obtained by feature extraction methods to the pixels of the sub-images forming the stereo images;
rendering the synthetic images to have a maximum resolution and a minimal image error and;
measuring with a control unit the processing time t, being the time elapsed since receiving the stereo image, and if the processing time t is longer than the time between receipt of two stereo images, the control unit modifies the processing parameters by either of the following two options:
at least one feature of the presently used feature vectors $F_L$ $F_R$ no longer evaluated, the processing size $G(t)$ is reduced;
or if the processing time t is shorter than the time between receipt of two stereo images, the control unit modifies the processing parameters by either of the following two options:
additional features are added to the presently used feature vectors $F_L$ and $F_R$;
the processing size $G(t)$ is enlarged,
in order that the generation of the synthetic images comprising the current stereo image is finished before a next stereo image in the sequence is received.

2. The method according to claim 1, wherein the resolution of the synthetic images as one control parameter is modified by the user depending on the measured processing time for the synthetic images.

3. The method according to claim 1, wherein the number of used features for the disparity estimation as one control parameter is modified by the user depending on the measured processing time for the synthetic images.

4. A device for the execution of a method for the generation of m>0 synthetic images from a stereo image of a stereo image sequence comprising at least a previous stereo image and a current stereo image, each with two or more sub-images having pixels, the sub-images being received left and right images, the method comprising:

identifying a constant image area consisting of pixels in a sub-image of a current stereo image that deviates from the pixels of an area of a sub-image of the previous stereo image by less than a given value $\epsilon$;

the pixels of the previous stereo image having computed disparity values, re-using the computed disparity values from the pixels of the area of the sub-image of the previous stereo image and assigning the computed disparity values to the pixels of the identified area of the sub-image of the current stereo image;

computing the disparity values for the non-constant image areas using processing parameters comprising vectors $F_L$ and $F_R$ size $G(t)$ wherein the vectors $F_L$ and $F_R$ assign features obtained by feature extraction methods to the pixels of the sub-images forming the stereo images;

rendering the synthetic images to have a maximum resolution, a minimal image error and;

measuring with a control unit the processing time t, being the time elapsed since receiving the stereo image, and if the processing time t is longer than the time between receipt of two stereo images, the control unit modifies the processing parameters by either of the following two options:

at least one feature of the presently used feature vectors $F_L$ and $F_R$ the is no longer evaluated; the processing size $G(t)$ is reduced, or if the processing time t is shorter than the time between receipt of two stereo images, the control unit modifies the processing parameters by either of the following two options:

additional features are added to the presently used feature vectors $F_L$ and $F_R$, the processing size $G(t)$ is enlarged;

comprising a compressor for adjusting an image size received to a desired processing size $G(t)$, a constant detector for identification of the constant image area, deviating by less than a given value $\epsilon$, a feature extractor for computation of the vectors $F_L$ and $F_R$, an image analyzer for generating the disparity values, an image synthesizer for the generation of the synthetic images comprising the current stereo image and a control unit that measures the processing time t and modifies the processing parameters, such that the generation of synthetic images comprising the current stereo image is finished before a next stereo image is received.

5. The device according to claim 4, wherein the constant detector obtains information from an MPEG encoding algorithm about the constant image areas deviating by less than the value $\epsilon$.

6. The method according to claim 1, wherein the feature vectors $F_L$ and $F_R$ comprise one or more features selected from the group consisting of color values, edge values and homogeneity values.

7. The device according to claim 4, wherein the feature vectors $F_L$ and $F_R$ comprise one or more features selected from the group consisting of color values, edge values and homogeneity values.

* * * * *

UNITED STATES PATENT AND TRADEMARK OFFICE
CERTIFICATE OF CORRECTION

| | |
|---|---|
| PATENT NO. | : 8,736,669 B2 |
| APPLICATION NO. | : 12/810681 |
| DATED | : May 27, 2014 |
| INVENTOR(S) | : Rolf-Dieter Naske |

It is certified that error appears in the above-identified patent and that said Letters Patent is hereby corrected as shown below:

In the Claims:

In Claim 1, column 6, line 23, please delete "image by less than a given value;" and insert -- image by less than a given value $\varepsilon$; --.

In Claim 1, column 6, lines 45-46, please delete "FL FR no longer evaluated" and insert -- FL and FR is no longer evaluated --.

In Claim 1, column 6, line 53, after "FR" delete ";" and insert -- , --.

In Claim 4, column 7, line 17, before "size" insert -- and the processing --.

In Claim 4, column 7, line 29, after "FR" delete "the".

Signed and Sealed this
Ninth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,736,669 B2  
APPLICATION NO. : 12/810681  
DATED : May 27, 2014  
INVENTOR(S) : Rolf-Dieter Naske It is certified that error appears in the above-identified patent and that said Letters Patent is hereby corrected as shown below:

In the Claims:

In Claim 1, column 6, line 23, please delete "image by less than a given value;" and insert -- image by less than a given value $\varepsilon$; --.

In Claim 1, column 6, lines 45-46, please delete "$F_L$ $F_R$ no longer evaluated" and insert -- $F_L$ and $F_R$ is no longer evaluated --.

In Claim 1, column 6, line 53, after "$F_R$" delete ";" and insert -- , --.

In Claim 4, column 7, line 17, before "size" insert -- and the processing --.

In Claim 4, column 7, line 29, after "$F_R$" delete "the".

This certificate supersedes the Certificate of Correction issued September 9, 2014.

Signed and Sealed this  
Twenty-first Day of October, 2014

Michelle K. Lee  
*Deputy Director of the United States Patent and Trademark Office*